Patented Feb. 16, 1943

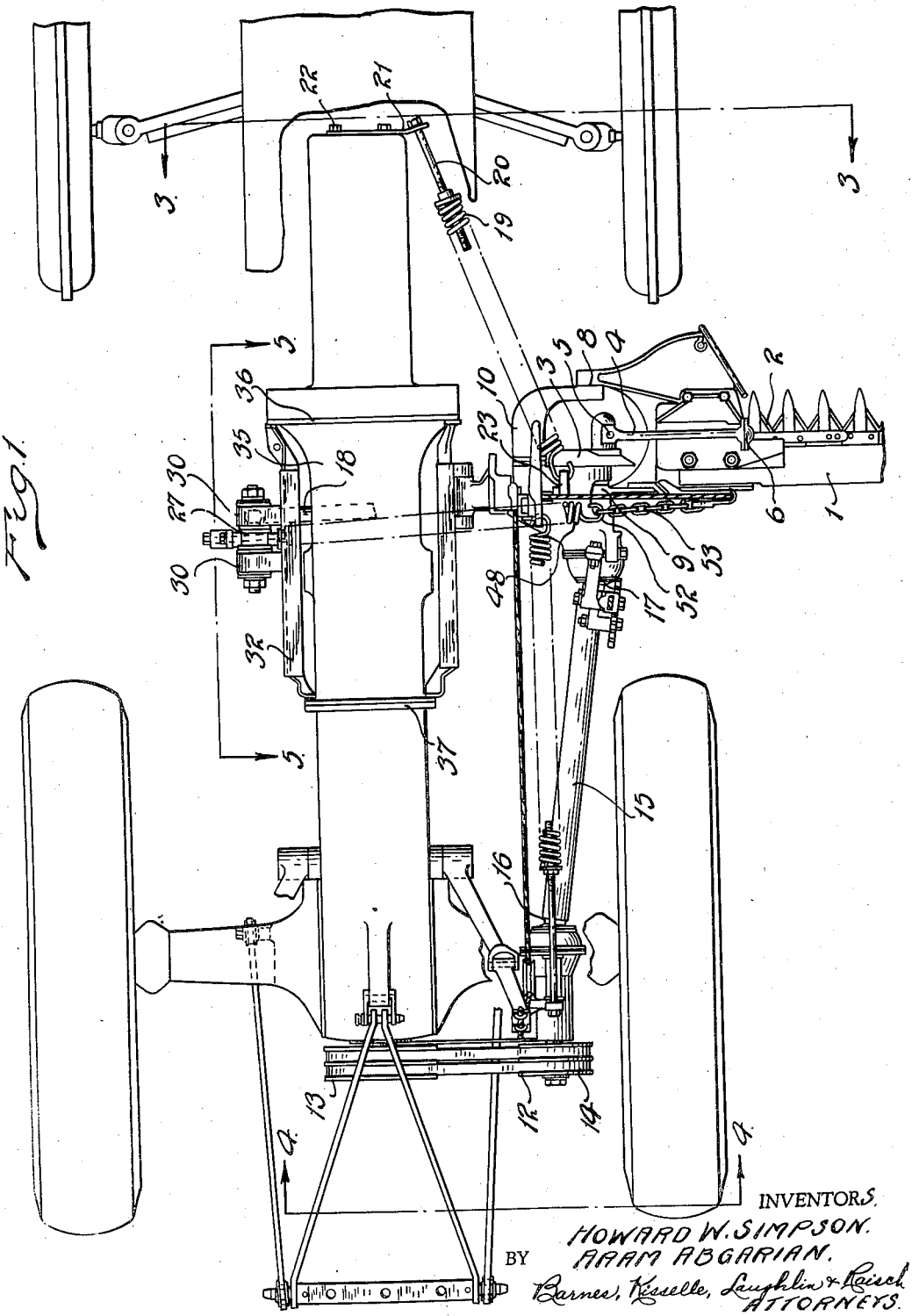

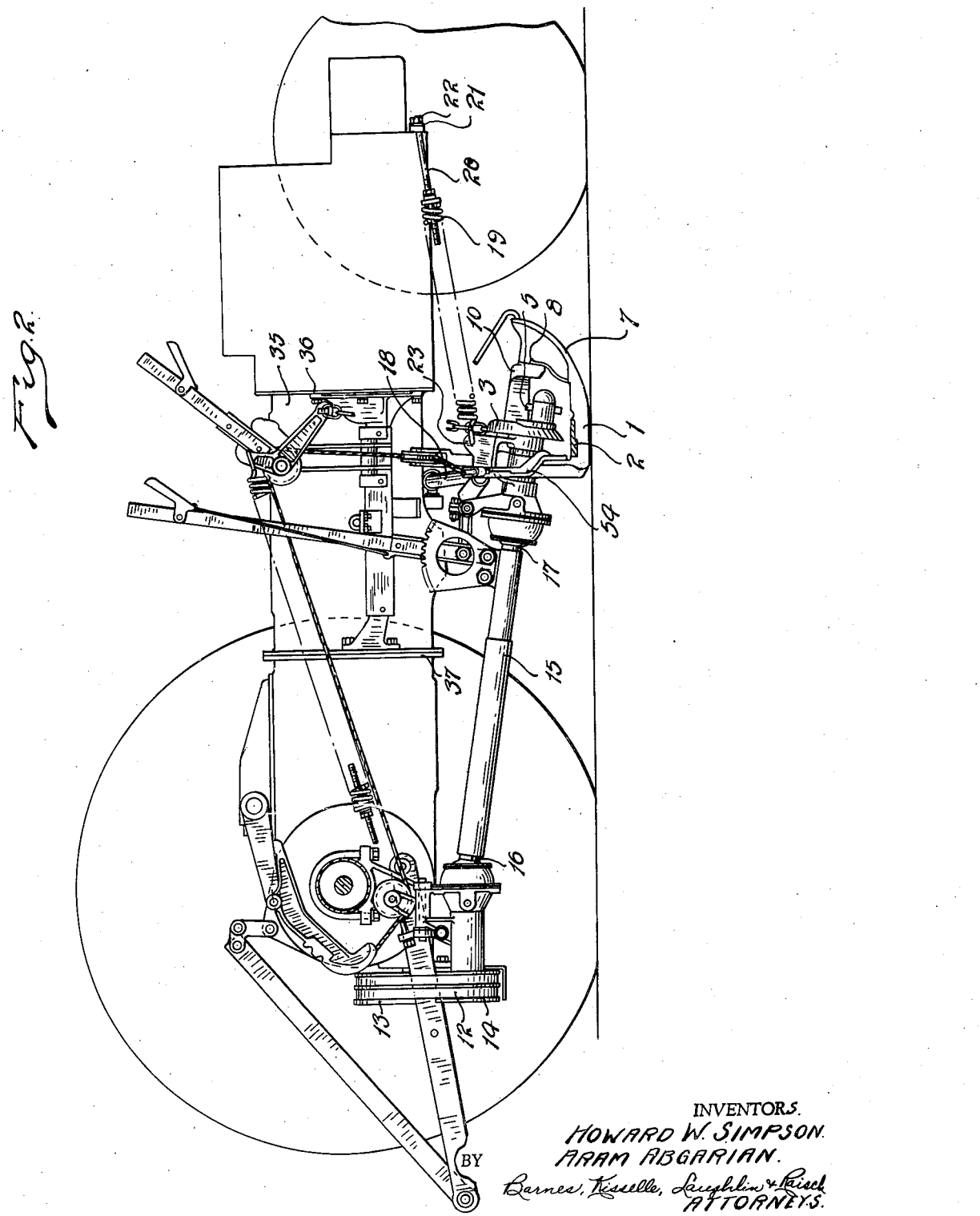

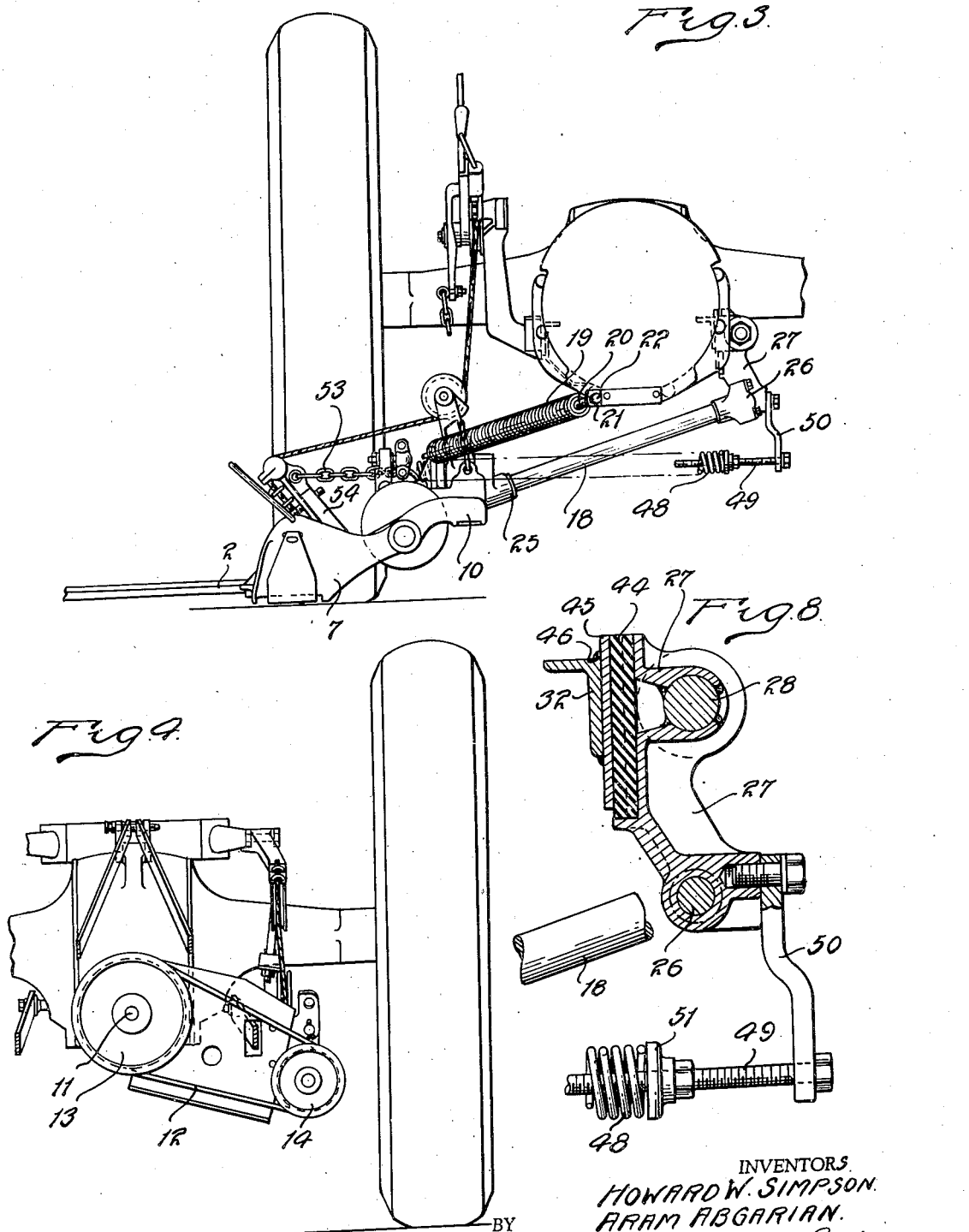

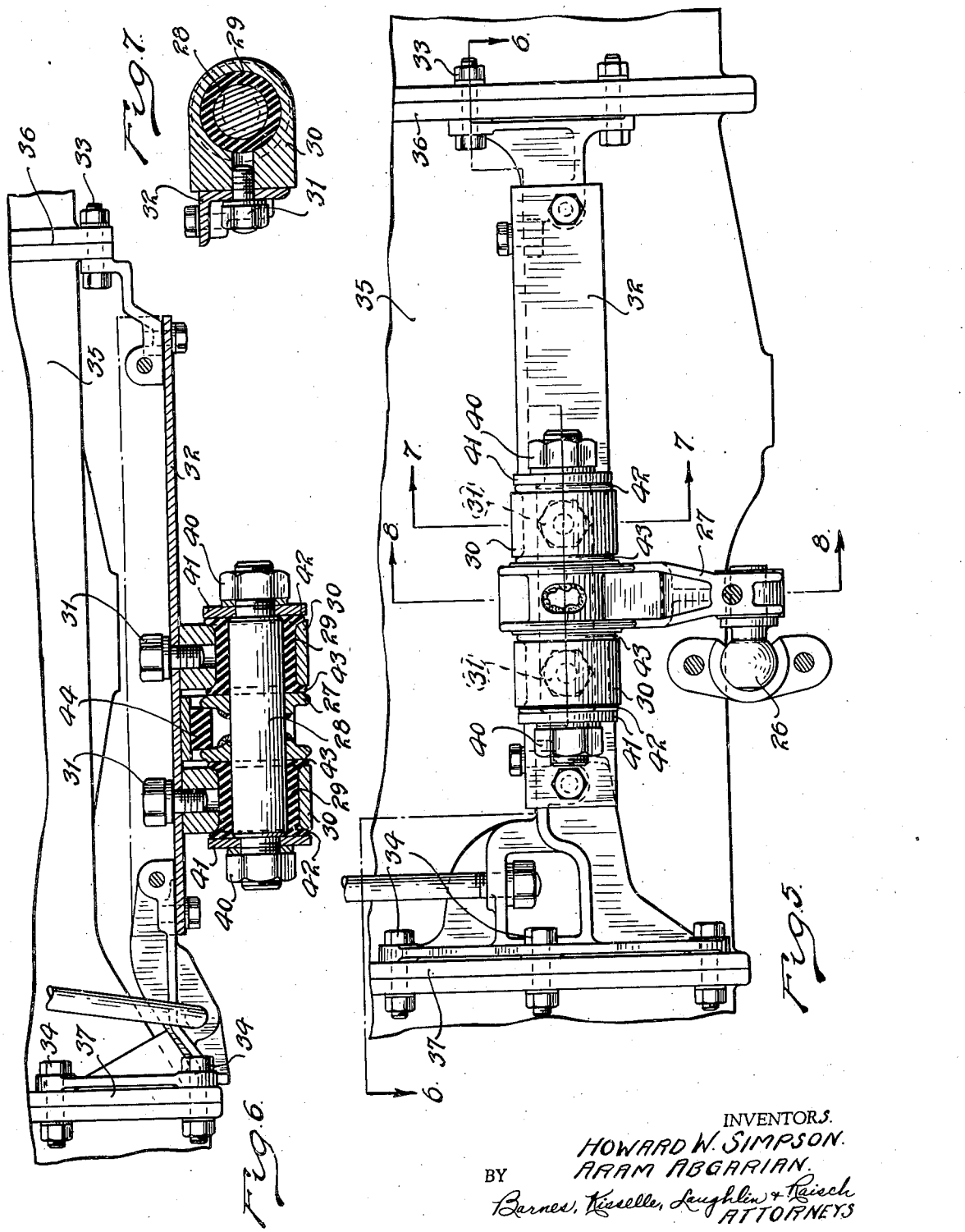

2,311,095

UNITED STATES PATENT OFFICE 2,311,095

SIDE MOWER FOR TRACTORS

Howard W. Simpson and Aram Abgarian, Detroit, Mich., assignors to Detroit Harvester Company, Detroit, Mich., a corporation of Michigan Application June 16, 1941, Serial No. 398,296

4 Claims. (Cl. 56—25)

This invention relates to a side mower for a tractor.

In mowing with a power mower the faster the tractor travels the faster necessarily the sickle must oscillate. Since the sickle weighs several pounds, a considerable vibration is created by the oscillation of the sickle when one attempts to run the tractor at a fairly high speed, say, seven or eight miles an hour. This vibration is transmitted to the tractor and is very undesirable. At high mower speeds this vibration is so intense that such a mower is commercially impractical.

It is the object of this invention to produce a high speed power mower which will efficiently cut a greater acreage in a given time than other mowers now on the market. This object is achieved by damping the vibration of the mower and thereby preventing practically all of this vibration from being transmitted to the frame of the tractor. In its specific form this vibration damping mechanism comprises a lever connected to the drag bar of the mower, the lever having a floating mounting in the tractor of distortable elastic material in compression and also in torsion.

In the drawings:

Fig. 1 is a plan view of the tractor and side mower.

Fig. 2 is a side elevation of the mower.

Fig. 3 is a front elevation of the mower taken along the line 3—3 of Fig. 1.

Fig. 4 is a rear elevation taken along the line 4—4 of Fig. 1.

Fig. 5 is a side elevation taken along the line 5—5 of Fig. 1.

Figs. 6, 7 and 8 are sections along the lines 6—6, 7—7 and 8—8 of Fig. 5.

Referring more particularly to the drawings there is shown a mower comprising a mower bar 1, an oscillating sickle or cutter knife 2, a flywheel 3, a pitman 4, one end of which is pivotally and eccentrically mounted on the flywheel 3 as at 5 and the other end of which is connected to the sickle 2 by ball and socket joint 6.

The inner end of the mower bar 1 is bolted or otherwise secured to the shoe 7. Shoe 7 is pivotally supported as at 8 and 9 on the frame member 10. The flywheel 3 is fixed on the forward end of a stub shaft which is journaled in the frame 10 and the rear end of the stub shaft is connected to shaft 15 by joint 17. This particular mounting of the flywheel 3 is old in the art. Power for operating the mower is transmitted from the power take-off shaft 11 (Fig. 4) of the tractor by means of a belt and pulley drive comprising belt 12, driving pulley 13 and driven pulley 14. Driven pulley 14 is connected by means of telescopic drive shaft 15 and the ball and socket joints 16 and 17 with the pitman flywheel 3. The ball and socket joints 16 and 17 at each end of the telescopic shaft 15 permit raising and lowering of the mower. The telescopic shaft 15 permits the mower bar to swing or break back in case the mower bar strikes an obstruction such, for example, as a tree trunk or steel stake.

The mower is connected to the tractor by means of a drag bar 18 and balance or pull spring 19. One end of the pull spring 19 is secured to a take-up rod 20 mounted on bracket 21 secured by bolts 22 to the front end of the tractor. The rear end of the spring 19 is connected to bracket 23 mounted on frame 10. The tractor pulls the mower through spring 19.

One end of the drag bar 18 is fixed to the frame 10 as at 25. The other end of the drag bar is connected by means of a ball and socket joint 26 with a lever 27. Lever 27 is fixed on shaft 28. Shaft 28 is mounted or floated in bushings 29. The bushings 29 are made from any suitable distortable elastic material such as soft rubber. Bushings 29 are mounted within the brackets 30 and are under compression at all times. Brackets 30 are secured by bolts 31 to plate 32. Plate 32 is secured by bolts 33 and 34 to the flanges 36 and 37 of the transmission housing 35 of the tractor. The tractor transmission housing is a casting. By bolting the plate 32 to the flanges of the housing the load is applied at the point of greatest strength and breaking of the cast housing is prevented.

Shaft 28 is provided at each end with a nut 40 and washer 41. Turning down of nuts 40 places the bushings 29 in compression. It will be noted that the compressed rubber bushings 29 are distorted into the area between the washer 41 and bracket 30 as at 42 and also in the area between the lever 27 and the bracket 30 as at 43. Thus, it will be seen that the shaft 28 and lever 27 are completely floated in rubber which is both in compression and also in torsion when the lever is vibrating, i. e., when the mower is operating. A block of rubber 44 is also mounted between the lever 27 and the plate 32. A plate 45 backs up the rubber block 44 and is welded to plate 32 as at 46. A balance spring 48 for the mower bar is connected at one end to take-up rod 49. Rod 49 is supported on bracket 50 which is bolted to the lower end of lever 27. The tension on spring 48 can be adjusted by adjusting nut 51 along the take-up rod 49. The other end of the balance spring 48 is connected as at 52 to chain 53. Chain 53 is connected to lever 54. Lever 54 is fixed to the shoe 7 of the mower bar. Thus, balance spring 19 counter-balances the weight of the mower bar.

In operation the sickle 2 oscillates at high speed transversely of the direction of travel of the tractor, that is, in a direction substantially perpendicular to the longitudinal axis of the tractor. This lateral or transverse reciprocation of the sickle 2 and of the flywheel 3 and pitman 4, particularly at high mower speeds, creates a lateral vibration which is transmitted to the drag bar 18. Only a very small and inconsequential portion of the vibration set up by the oscillating mower members is exerted longitudinally of the tractor. The vibration transmitted to the drag bar 18 is transmitted in turn to the lever 27. Practically speaking, none of the vibration is transmitted to the plate 32 and tractor frame. The rubber bushings, which are continuously in compression and which also are in torsion as the lever 27 vibrates or oscillates, effectively damp and practically eliminate this vibration.

The rubber blocks 44 also assist in damping some of the vibration, particularly at the extreme ends of the swinging movement of the lever 27 on its support brackets 30. In other words, lever 27 oscillates clockwise and then counter-clockwise, as viewed in Fig. 8, due to the vibrations transmitted to it by drag bar 18. During clockwise oscillation of the lever 27, the lower end of block 44 is in compression and acts as a dampener or vibration absorber. During counter-clockwise oscillation of lever 27, the upper portion of block 44 is in compression and serves to dampen or arrest the further counter-clockwise oscillation of the lever 27. Block 44, as herein shown for descriptive purposes only, is auxiliary to the rubber bushings 29 and can be omitted or, in some instances, block 44 alone will be used with lever 27 to damp vibrations and bushings 29 omitted. However, in the preferred form of the invention, bushings 29 will be used as shown. Block 44 serves primarily as a safety buffer to take care of the oscillations of the lever 27 of extreme amplitude and to position the lever when assembling. The use of block 44 also permits the shaft 28 and lever 27 to be mounted closer in or toward the plate 32 and obviates any chance of metal to metal contact of lever 27 and plate 32.

We claim:

1. In a mowing machine adapted for attachment to a tractor, said mowing machine including a mower bar, an oscillating sickle, and a drag bar one end of which is secured to the mower bar, said drag bar extending generally laterally of the tractor, a pivoted lever member connected to the other end of the drag bar, a support for the said pivoted lever member mounted on the tractor, said support including distortable elastic material in compression and also in torsion when the mowing machine is operating for floating the pivoted member whereby the vibration transmitted through the drag bar to the pivoted lever member is damped.

2. In a mowing machine adapted for attachment to a tractor, said mowing machine including a mower bar, an oscillating sickle, and a drag bar one end of which is secured to the mower bar, said drag bar extending generally laterally of the tractor, a lever pivotally connected to the other end of the drag bar, and a pivotal mounting for said lever on the tractor about which the lever swings as the drag bar vibrates transversely of said tractor whereby the transmission of vibration from the mower to the tractor is materially reduced.

3. In combination, a tractor, a mowing machine including a mower bar and an oscillating sickle, a drag bar, connections between the drag bar and the mower bar and between the drag bar and the tractor, one of said connections including a pivoted lever member and a mounting for said lever of distortable elastic material in compression and in torsion when the mowing machine is operating for damping the vibration set up by the oscillating sickle.

4. In combination, a tractor, a mowing machine including a mower bar and an oscillating sickle member, a drag bar having one end fixed to the mower bar, a pivoted lever member connected to the other end of the drag bar, a support for said pivoted lever member adapted to be mounted on the tractor, and distortable elastic material in compression between the pivoted member and the support and also in torsion as the lever member swings about its pivot for damping the vibration set up by the oscillating member and transmitted through the drag bar to the pivoted lever member.

HOWARD W. SIMPSON.
ARAM ABGARIAN.